(12) United States Patent
Cook (10) Patent No.: US 10,054,774 B2
(45) Date of Patent: Aug. 21, 2018

(54) FIVE-MIRROR AFOCAL WIDE FIELD OF VIEW OPTICAL SYSTEM

(71) Applicant: RAYTHEON COMPANY, Waltham, MA (US)

(72) Inventor: Lacy G. Cook, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 339 days.

(21) Appl. No.: 14/871,407

(22) Filed: Sep. 30, 2015

(65) Prior Publication Data

US 2017/0090171 A1    Mar. 30, 2017

(51) Int. Cl.
*G02B 17/06* (2006.01)
*G02B 17/00* (2006.01)

(52) U.S. Cl.
CPC ....... *G02B 17/0657* (2013.01); *G02B 17/008* (2013.01); *G02B 17/0663* (2013.01)

(58) Field of Classification Search
CPC ....... G02B 13/14–13/143; G02B 13/22; G02B 17/008; G02B 17/06; G02B 17/0647–17/0663; G02B 23/02; G02B 23/06; G02B 27/0025
See application file for complete search history.

(56) References Cited

U.S. PATENT DOCUMENTS

| | | | |
|---|---|---|---|
| 3,674,334 A | 7/1972 | Offner | |
| 4,226,501 A * | 10/1980 | Shafer | G02B 17/0663 359/366 |
| 4,804,258 A | 2/1989 | Kebo | |
| 5,078,502 A * | 1/1992 | Cook | G02B 17/0615 359/366 |
| 5,999,311 A * | 12/1999 | Nanba | G02B 15/16 359/365 |
| 6,278,553 B1 * | 8/2001 | Akiyama | G02B 3/0087 359/563 |
| 6,333,811 B1 | 12/2001 | Tatian et al. | |
| 6,902,282 B2 | 6/2005 | Cook | |
| 2004/0021934 A1 * | 2/2004 | Cook | G01J 3/02 359/366 |

(Continued)

FOREIGN PATENT DOCUMENTS

WO    0073845 A1    12/2000

OTHER PUBLICATIONS

International Search Report and Written Opinion of the International Searching Authority for application No. PCT/US2016/042047 dated Oct. 5, 2016.

(Continued)

*Primary Examiner* — Stephone B Allen
*Assistant Examiner* — James McGee
(74) *Attorney, Agent, or Firm* — Lando & Anastasi, LLP (57) ABSTRACT

A five-mirror all-reflective afocal anastigmat. In one example, a five mirror afocal anastigmat includes five mirrors arranged to sequentially reflect from one another electromagnetic radiation received via a system entrance pupil to produce a collimated output beam of the electromagnetic radiation at a system exit pupil, the five mirrors consisting of three positive-powered mirrors and two negative-powered mirrors, wherein optical powers of the five mirrors are balanced to achieve a flat field condition at the system exit pupil.

14 Claims, 6 Drawing Sheets

(56) References Cited

U.S. PATENT DOCUMENTS

2012/0057242 A1* 3/2012 Takahashi .............. G02B 13/18
359/631

OTHER PUBLICATIONS

Sampath et al., "The WISE Telescope and Scanner: Design Choices and Hardware Results" Proc. of SPIE vol. 7796, No. 779609, 2010, pp. 1-11. DOI: 10.1117/12.864347.
Henault, F., "Phase-shifting technique for improving the imagine capacity of sparse-aperture optical interferometers" Applied Optics, vol. 50, No. 21, 2011, pp. 4207-4220. DOI: 10.1364/A0.50.004207.
Wetherell, W., "All-reflecting Afocal Telescopes" Optomechantronic Micro/Nano Devices and Components III, vol. 751, 1987, pp. 126-134.

* cited by examiner

| Surface Number | Description | Radius (inches) | CC | Ad(r^4) | Ae(r^6) | Af(r^8) | Ag(r^10) | Thickness (inches) | Material |
|---|---|---|---|---|---|---|---|---|---|
| 1 | Entrance Pupil (270) | Infinity | | | | | | 11.0000 | Air |
| 2 | First Mirror (210) | -17.6870 | -1.09032 | -2.4079E-07 | 7.7738E-11 | -9.0726E-14 | -6.2591E-15 | -5.7517 | Refl |
| 3 | Second Mirror (220) | -6.3643 | -1.27612 | -2.1074E-05 | -3.0117E-06 | 2.4728E-08 | -1.0701E-09 | 5.7520 | Refl |
| 4 | Third Mirror (230) | -13.4359 | -0.60505 | -1.8339E-05 | -6.3735E-07 | 9.2437E-10 | -1.8354E-11 | -5.7475 | Refl |
| 5 | Fourth Mirror (240) | -13.7119 | 0 | -6.5978E-04 | -2.1070E-05 | -3.4441E-06 | 1.1734E-06 | 5.7473 | Refl |
| 6 | Fifth Mirror (250) | -10.2809 | -0.27906 | 4.5315E-06 | 1.1158E-07 | 3.5606E-09 | -1.0912E-10 | -7.5631 | Refl |
| 7 | Exit Pupil (280) | Infinity | | | | | | | Air |

FIG. 3A

| Surface Number | Description | Z5 | Z8 | Z10 | Z12 | Z14 | Z17 | Z19 | Z21 |
|---|---|---|---|---|---|---|---|---|---|
| 1 | Entrance Pupil (270) | | | | | | | | |
| 2 | First Mirror (210) | 7.8310E-05 | -3.3281E-06 | 8.4928-07 | 1.7433E-07 | 2.7147E-08 | -3.3052E-09 | 2.319E-10 | -6.6845E-11 |
| 3 | Second Mirror (220) | 4.8133E-04 | -1.7126E-04 | 9.9092E-06 | 1.3125E-05 | 2.1175E-05 | -1.9416E-07 | -1.732E-07 | -1.2674E-07 |
| 4 | Third Mirror (230) | -1.6213E-04 | -1.4794E-04 | 6.6576E-06 | -6.7588E-07 | 3.5754E-07 | 6.2742E-07 | 6.522E-08 | 4.4473E-09 |
| 5 | Fourth Mirror (240) | -3.3480E-04 | -2.4950E-03 | -1.3551E-04 | -2.1315E-04 | 1.0070E-05 | 7.7434E-05 | 9.028E-05 | 2.1049E-05 |
| 6 | Fifth Mirror (250) | -1.0678E-04 | -3.1978E-05 | 4.2929E-06 | 1.2424E-06 | 2.3487E-07 | 3.2334E-06 | 2.302E-07 | 3.6628E-08 |
| 7 | Exit Pupil (280) | | | | | | | | |

FIG. 3B

Zernike Figure Terms

| Term | Polar | Cartesian | Form |
|---|---|---|---|
| Z5 | r Cos 2theta | $x^2 - y^2$ | astig. |
| Z8 | r^3 Sin theta | $y(x^2 + y^2)$ | coma |
| Z10 | r^3 Sin 3theta | $y(3x^2 - y^2)$ | clover |
| Z12 | r^4 Cos 2theta | $x^4 - y^4$ | astig. |
| Z14 | r^4 Cos 4theta | $x^4 - 6 x^2 y^2 + y^4$ | |
| Z17 | r^5 Sin theta | $y(x^2 + y^2)^2$ | coma |
| Z19 | r^5 Sin 3theta | $3 x^4 y + 2 x^2 y^3 - y^5$ | clover |
| Z21 | r^5 Sin 5theta | $5 x^4 y - 10 x^2 y^3 + y^5$ | |

FIVE-MIRROR AFOCAL WIDE FIELD OF VIEW OPTICAL SYSTEM

BACKGROUND

Wide field of view (WFOV) optical systems, such as reflective afocal telescopes are used in a variety of applications, such as multispectral applications and certain space sensor systems, for example. All-reflective optical systems are desirable for many wideband optical applications because they reflect all wavelengths of incident light equally, unlike refractive systems wherein the refraction is wavelength dependent. The object space field of view may be viewed at the exit pupil by various types of sensors which include an imaging (focal) optical system and a detector, such as a focal plane array.

Conventional afocal WFOV reflective optical systems include the three mirror anastigmat (TMA) telescope and the four mirror anastigmat (4MA) telescope. The three mirror afocal design provides usable object space field of view (FOV) coverage in two distinct regimes: 1) at high magnifications (>10×) and utilizing an on-axis primary mirror, the useable FOV is limited to about 1.0-1.5 degrees, and 2) at moderate magnifications (4-5×) and utilizing an off-axis primary mirror, the useable FOV is limited to about 2.0-2.5 degrees. U.S. Pat. No. 3,674,334 provides examples of all-reflective afocal three mirror anastigmats. The four mirror afocal design provides improvements over the TMA, but performance metrics, such as image quality, distortion, and pupil aberrations, limit its usefulness to about 5-6 degrees circular FOV. Additionally, most four mirror afocal anastigmat optical designs can be excessively large in size. U.S. Pat. No. 4,804,258 provides an example of an all-reflective afocal four mirror anastigmat.

SUMMARY OF INVENTION

Aspects and embodiments are directed to a new and improved five mirror afocal optical design that overcomes certain disadvantages associated with conventional afocal optical forms, and provides higher usable field of view, for example, exceeding 5 degrees circular FOV, and in certain examples in the range of about 6-8° circular FOV or even up to approximately 10° circular FOV. Additionally, within those parameters, certain embodiments also provide a compact size, and superior image quality, field distortion, and pupil aberrations.

The new and improved afocal optical system according to aspects and embodiments of the present invention provides the art with a five mirror afocal reflective telescope. The afocal optical system includes five mirrors arranged to sequentially reflect from one another electromagnetic radiation received via a system entrance pupil to produce a collimated output beam of the electromagnetic radiation at a system exit pupil. In one example, the five mirrors consist of three positive-powered mirrors and two negative-powered mirrors, wherein optical powers of the five mirrors are balanced to achieve a flat field condition at the system exit pupil. In one example, the five mirrors are arranged to have a + − + − + optical power distribution. In one example the first four mirrors cooperate to form an intermediate image positioned between the fourth and fifth mirrors. The system can include a field stop located at the intermediate image position.

In one embodiment a five mirror all-reflective afocal optical system comprises a positive-powered primary mirror arranged and configured to receive and reflect collimated electromagnetic radiation received via an entrance pupil of the afocal optical system, a negative-powered second mirror arranged and configured to receive and further reflect the electromagnetic radiation reflected from the primary mirror, a positive-powered third mirror arranged and configured to receive and further reflect the electromagnetic radiation reflected from the secondary mirror, a negative-powered fourth mirror arranged and configured to receive and further reflect the electromagnetic radiation reflected from the tertiary mirror to form an intermediate image, and a positive-powered fifth mirror configured to receive and re-collimate the electromagnetic radiation reflected from the quaternary mirror and to reflect the re-collimated electromagnetic radiation through an exit pupil of the afocal optical system.

In one example a circular field of view of the system is in a range of approximately 6° to 10°. In another example a magnification of system is approximately 4.0×. In another example the entrance pupil has a diameter of approximately 5.0 inches. In one example each of the first, second, third, fourth, and fifth mirrors has an aspheric surface figure.

According to another embodiment a five-mirror all-reflective afocal optical system comprises five mirrors arranged to sequentially reflect from one another electromagnetic radiation received via a system entrance pupil to produce a collimated output beam of the electromagnetic radiation at a system exit pupil, the five mirrors consisting of three positive-powered mirrors and two negative-powered mirrors, wherein optical powers of the five mirrors are balanced to achieve a flat field condition at the system exit pupil.

In one example the five mirrors are arranged into a Mersenne telescope followed by an afocal pupil relay, the Mersenne telescope including a first one of the three positive powered mirrors followed by a first one of the two negative powered mirrors, and the afocal pupil relay including a second one of the two negative powered mirrors positioned between second and third ones of the three positive powered mirrors, such that the system has a + − + − + optical power distribution. In one example the entrance pupil has a diameter of approximately 5.0 inches, and the system has a magnification of approximately 4.0× and a circular field of view in a range of approximately 6° to 10°. In one example each of the five mirrors has an aspheric surface figure. In another example the five mirrors consist of a positive-powered primary mirror arranged and configured to receive and reflect the electromagnetic radiation from the entrance pupil, a negative-powered second mirror arranged and configured to receive and further reflect the electromagnetic radiation reflected from the primary mirror, a positive-powered third mirror arranged and configured to receive and further reflect the electromagnetic radiation reflected from the secondary mirror, a negative-powered fourth mirror arranged and configured to receive and further reflect the electromagnetic radiation reflected from the tertiary mirror to form an intermediate image, and a positive-powered fifth mirror configured to receive and re-collimate the electromagnetic radiation reflected from the quaternary mirror and to reflect the re-collimated electromagnetic radiation through the exit pupil to provide the collimated output beam.

According to another embodiment, a five-mirror all-reflective afocal optical system comprises a two-mirror Mersenne telescope consisting of a first positive-powered mirror configured to receive electromagnetic radiation via a system entrance pupil and to reflect the electromagnetic radiation, and a first negative-powered mirror configured to receive and further reflect the electromagnetic radiation reflected from the first positive-powered mirror, and a three-mirror afocal pupil relay configured to receive the electromagnetic radiation from the two-mirror Mersenne telescope and to reflect and collimate the electromagnetic radiation to provide a collimated output beam of the electromagnetic radiation at a system exit pupil, the three-mirror afocal pupil relay including a second negative-powered mirror.

In one example the three-mirror afocal pupil relay consists of a second positive-powered mirror, the second negative-powered mirror, and a third positive-powered mirror, the second negative-powered mirror being positioned between the second and third positive-powered mirrors. In one example the optical powers of the first positive-powered mirror, the first negative-powered mirror, the second positive-powered mirror, the second negative-powered mirror, and the third positive-powered mirror are balanced to achieve a flat field condition at the system exit pupil. In another example each of the first positive-powered mirror, the first negative-powered mirror, the second positive-powered mirror, the second negative-powered mirror, and the third positive-powered mirror has an aspheric surface figure. In another example the entrance pupil has a diameter of approximately 5.0 inches, and the system has a magnification of approximately 4.0× and a circular field of view in a range of approximately 6° to 10°.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to a five-mirror all-reflective afocal optical form, particularly, an afocal five-mirror anastigmat (5MA) that extends the usable field of view (FOV) relative to conventional three-mirror or four-mirror anastigmat designs, while also providing other additional advantages. As discussed above, the conventional afocal four-mirror anastigmat, while providing enhanced performance and capability relative to three-mirror designs, is limited by performance metrics, such as image quality, distortion, and pupil aberrations, for example, to a usable circular FOV of about 5-6°. Although the total FOV coverage of some afocal four-mirror anastigmat designs may be larger, the useful FOV for most practical applications is limited. Additionally, certain afocal four mirror designs are excessively large in size. Embodiments of the afocal 5MA disclosed herein extend the usefulness of the all-reflective optical form, such as wideband spectral coverage, to larger fields of view, for example, approaching 10° circular FOV, with improved performance metrics and in certain examples, reduced physical size for comparable parameters. The afocal 5MA disclosed herein provides the art with a fundamentally new afocal optical design form having numerous advantages, as discussed in more detail below.

Conventionally, afocal all-reflective optical design forms have been limited to four or fewer mirrors, as discussed above. There are certain focal (also referred to as imaging) five mirror optical designs; however, focal optical systems are vastly different from afocal optical systems in arrangement, structure, and function. Accordingly, the design principles and objectives for these two types of optical system (focal and afocal) are fundamentally different and not readily transferable from one type of system to the other.

Figure 1:
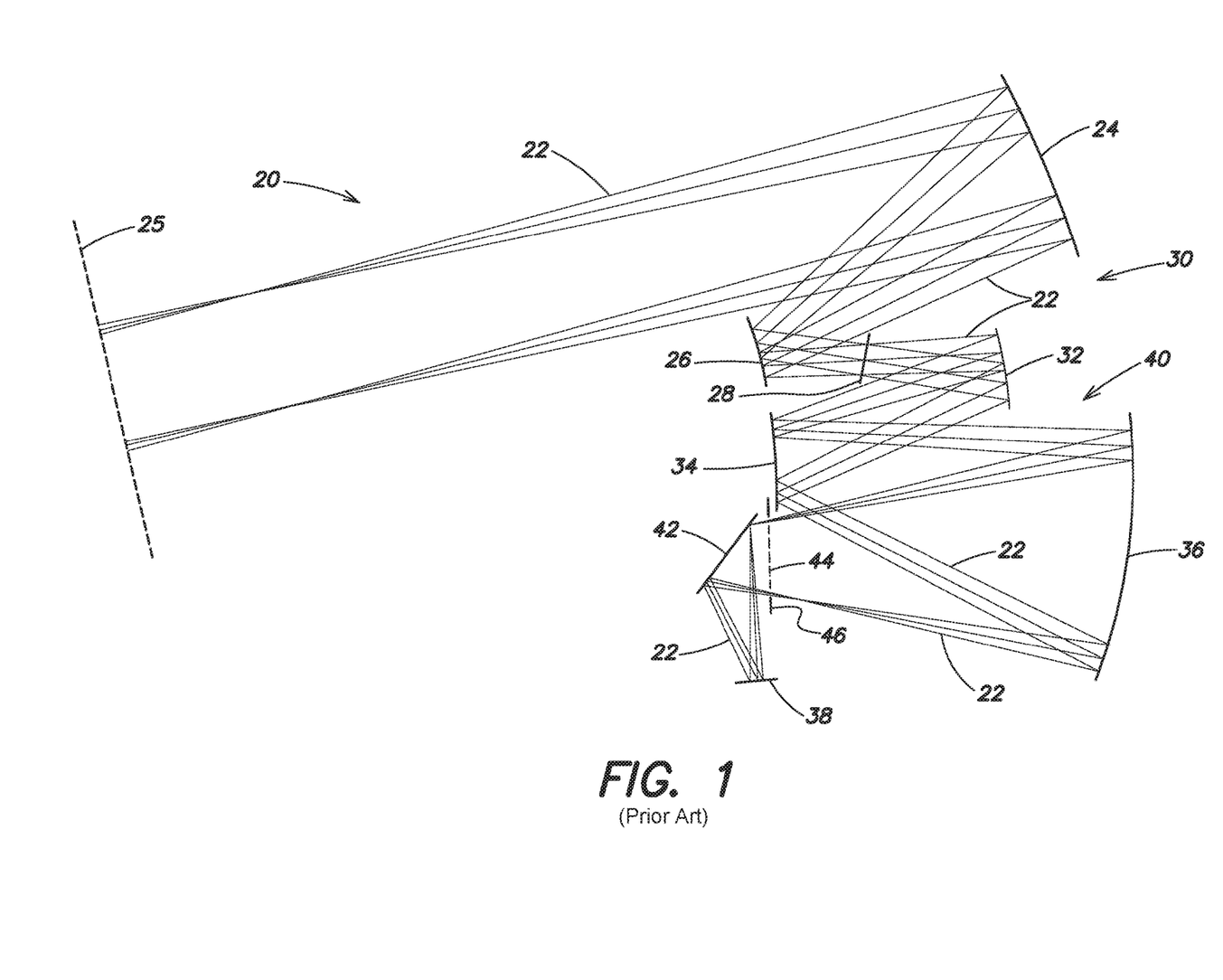
FIG. 1 is an elevational schematic view (in the minor field of view plane) of an example of a conventional all-reflective, relayed focal optical system.

U.S. Pat. No. 6,902,282 provides an example of a five-mirror all-reflective relayed focal optical system. FIG. 1 is an elevational schematic view (in the minor field of view plane) of an example of the all-reflective, relayed focal optical system 20 disclosed in U.S. Pat. No. 6,902,282. The focal optical system 20 includes a first mirror 24 receiving the beam path 22 from a real entrance pupil 25, and a second mirror 26 receiving the beam path 22 reflected from the first mirror 24. The first mirror 24 and the second mirror 26 together function as a multi-mirror reflective objective optical component 30 that forms an intermediate image 28 after the beam path 22 reflects from the second mirror 26. The focal optical system 20 further includes a third mirror 32 that reflects the intermediate image 28, a fourth mirror 34 that reflects the beam path 22 previously reflected by the third mirror 32, and a fifth mirror 36 that reflects and focuses the beam path 22 previously reflected by the fourth mirror 34 to an image location 38. A real image of the real entrance pupil 25 is formed at a re-imaged pupil location 44 between the fifth mirror 36 and the image location 38. A system aperture stop 46 may be placed at this re-imaged pupil location 44. The third mirror 32, fourth mirror 34, and fifth mirror 36 together function as a multi-mirror relay optical component 40 that relays the intermediate image 28 to the final image location 38 in the beam path 22. Thus, the five mirror design of the system 20 can be considered as a two mirror focal or imaging objective 30 (which produces the intermediate image 28) and a three mirror focal relay 40 that produces the final image at image location 38. As shown in FIG. 1, an unpowered flat mirror 42 optionally can be included in the beam path 22, serving as a fold mirror to redirect the beam path, but is not considered one of the five mirrors of the five-mirror relayed focal optical system.

The defining characteristic of a focal optical system is that it produces as an output a focused image at a specified image plane. For example, the system 20 of FIG. 1 receives collimated light as an input at the entrance pupil 25 and produces as an output an image at image location 28. In contrast, an afocal optical system is defined by producing a collimated output from a collimated input. Thus, the design and arrangement of the mirrors making up a focal versus an afocal system are vastly different because the combination of optical powers and arrangement of the mirrors in a focal system must be selected to achieve an output image; whereas the combination of optical powers and arrangement of mirrors in an afocal system must be selected to achieve a collimated (i.e., focused to infinity, or having parallel rays) output. In addition, due to the fundamentally different nature of the output of the two systems (image versus collimated), the optical design parameters for the various mirrors (e.g., surface shape, conic features, optical power, etc.) that must be considered in order to achieve compensation for optical aberrations are also significantly different.

As discussed above, an afocal optical system is often used as the front optics for overall system, and its collimated output is provided as the input to a subsequent focal (imaging) optical system that produces an output image for viewing or analysis. The relayed form of the focal system 20 of FIG. 1 is particularly well suited to this type of application because, with the real entrance pupil 25 being the image of a real aperture stop, the optical system 20 can follow another optical system (such as a high magnification afocal telescope) and be ideally matched pupil-to-pupil.

Figure 2:
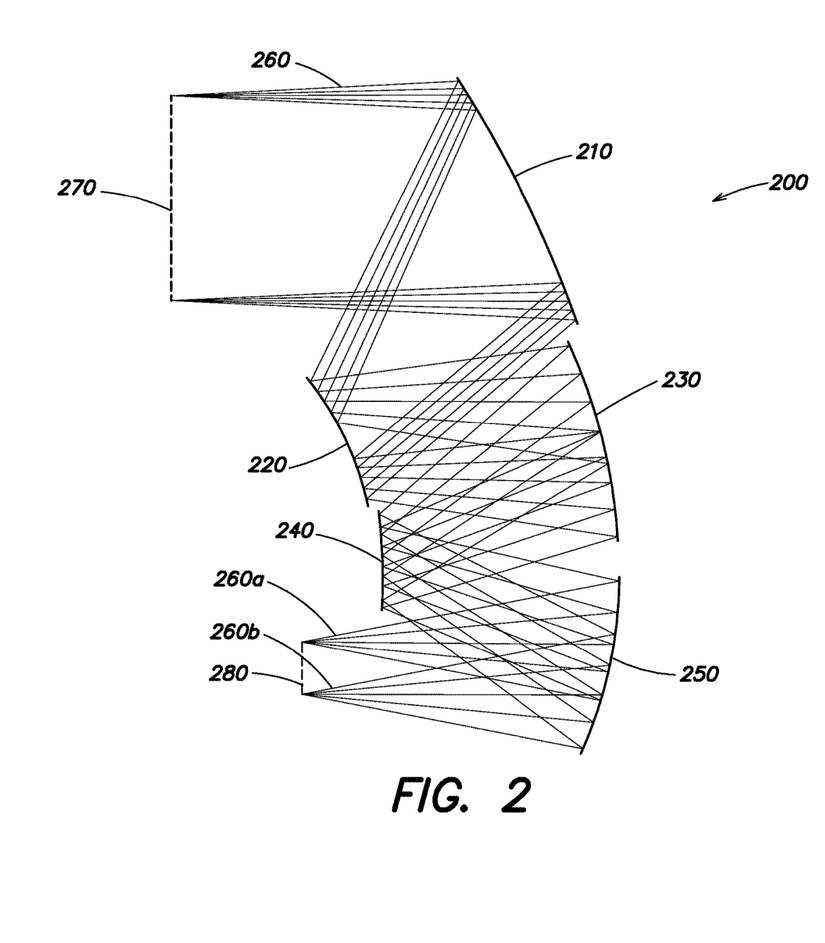
FIG. 2 is a ray trace of one example of an afocal five-mirror all-reflective optical system according to aspects of the present invention.

Referring to FIG. 2 there is illustrated a ray trace of one example of an afocal five-mirror anastigmat (5MA) according to one embodiment. The afocal 5MA 200 is a relayed afocal optical system including five non-spherical mirrors. The afocal 5MA 200 includes a first mirror 210 that receives electromagnetic radiation 260, also referred to as the beam path 260, via an entrance pupil 270. In the illustrated example, the first mirror 210 has positive optical power, and reflects the electromagnetic radiation 260 toward a second mirror 220. The second mirror 220 has negative optical power. The second mirror 220 receives the electromagnetic radiation reflected from the first mirror 210 and reflects the electromagnetic radiation toward a third mirror 230. The third mirror 230 has positive optical power. The third mirror 230 receives the electromagnetic radiation reflected from the second mirror 220 and further reflects the electromagnetic radiation toward a fourth mirror 240. The fourth mirror 240 has negative optical power. The fourth mirror 240 receives the electromagnetic radiation reflected from the third mirror 230 and further reflects the electromagnetic radiation toward a fifth mirror 250 having positive optical power. The fifth mirror 250 receives the electromagnetic radiation reflected from the fourth mirror 240 and reflects and recollimates the electromagnetic radiation to focus at infinity to provide a collimated output beam at the exit pupil 280. As can be seen with reference to FIG. 2, corresponding ray pairs in the output beam, for example, rays 260*a* and 260*b*, are parallel in accord with the definition of a collimated output beam (focused at infinity). The afocal 5MA 200 thus receives a collimated input beam of the electromagnetic radiation 260 at the entrance pupil 270 and produces a collimated output beam of the electromagnetic radiation at the exit pupil 280. In the illustrated example, the afocal 5MA has the system has a + − + − + optical power distribution.

According to one embodiment, the first, second, third, and fourth mirrors 210, 220, 230, and 240 cooperate to form an intermediate image that is located between the fourth mirror 240 and the fifth mirror 250. As discussed above, the fifth mirror 250 recollimates the electromagnetic radiation from the intermediate image to provide the collimated output beam at the exit pupil 280. Thus, the afocal 5MA 200 can be considered to include a four-mirror objective (formed by the first, second, third, and fourth mirrors 210, 220, 230, and 240 which precede the intermediate image) followed by a one-mirror recollimating eyepiece (the fifth mirror 250). Alternatively, the afocal 5MA can be considered as a two-mirror afocal Mersenne telescope (defined by the + − optical power distribution of the first and second mirrors 210 and 220) followed by a three-mirror afocal pupil relay (formed by the third, fourth, and fifth mirrors 230, 240, and 250). As discussed above, in one example this three-mirror afocal pupil relay has a + − + optical power distribution. The optical power of the three positive mirrors is balanced by the optical power of two negative mirrors to provide a zero Petzval curvature or a flat field condition at the exit pupil 280. Further, the negative optical power of both the second mirror 220 and the fourth mirror 240 is available to balance the field curvature of the other three mirrors, advantageously allowing for improvement in performance metrics as discussed further below.

Still referring to FIG. 2, the entrance pupil 270 is positioned in front of the first mirror 210, and this entrance pupil is offset vertically from the system optical axis. An aperture stop can be positioned at the entrance pupil 270. In one embodiment, the system is configured to be off axis in aperture only, or in another embodiment to be off axis both aperture and field to produce or determine the positions of the reflective surface of the first mirror 210 and the exit pupil 280. In either example, neither the entrance pupil 260 nor the exit pupil 280 is centered on the optical axis. Any or all of the second, third, fourth, and fifth mirrors can be tilted and decentered to improve the optical performance of the system 200.

In certain examples all of the five mirrors 210-250 can have rotationally symmetric aspheric mirror forms. In other examples, one or more of the five mirrors 210-250 can have a more advanced, non-rotationally symmetric (e.g., Zernike described) aspheric mirror form. The use of non-rotationally symmetric aspheric mirror forms can provide improved performance in terms of wavefront quality, field distortion, and pupil aberrations.

Figure 3A:
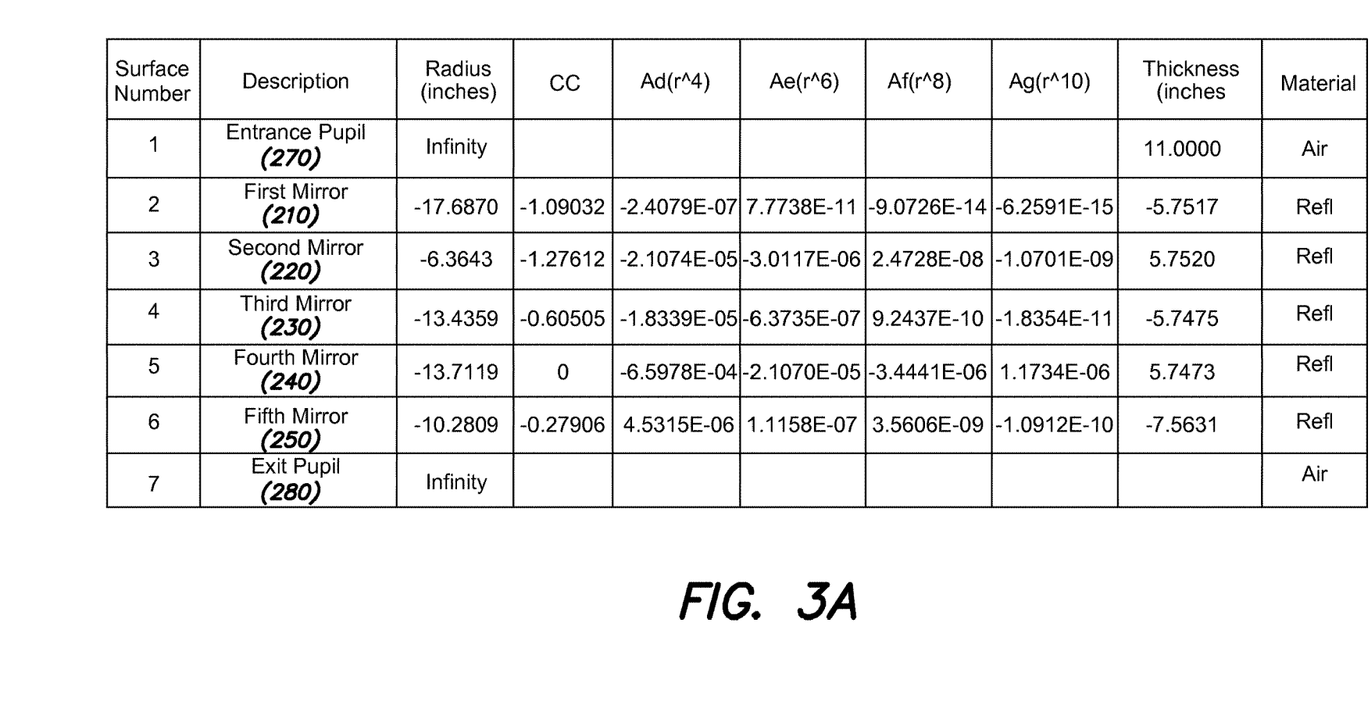
FIG. 3A is a table providing an example of an optical prescription for the optics illustrated in FIG. 2.
Figure 3B:
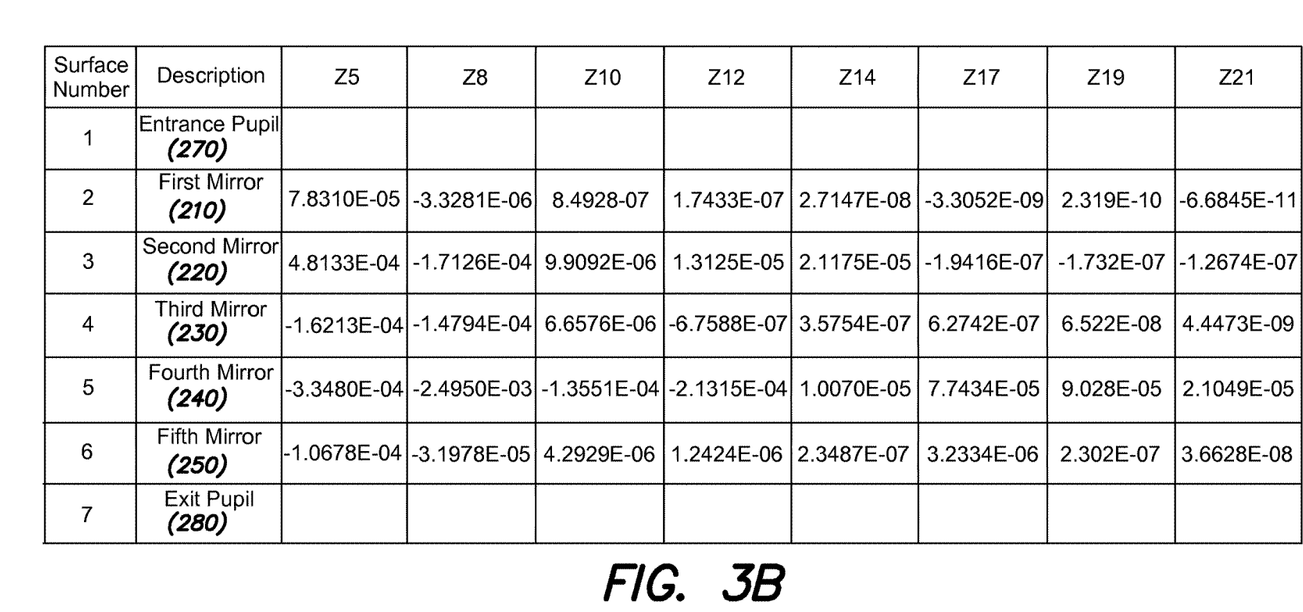
FIG. 3B is a table showing the Zernike terms corresponding to the optical prescription of FIG. 3A.
Figure 3C:
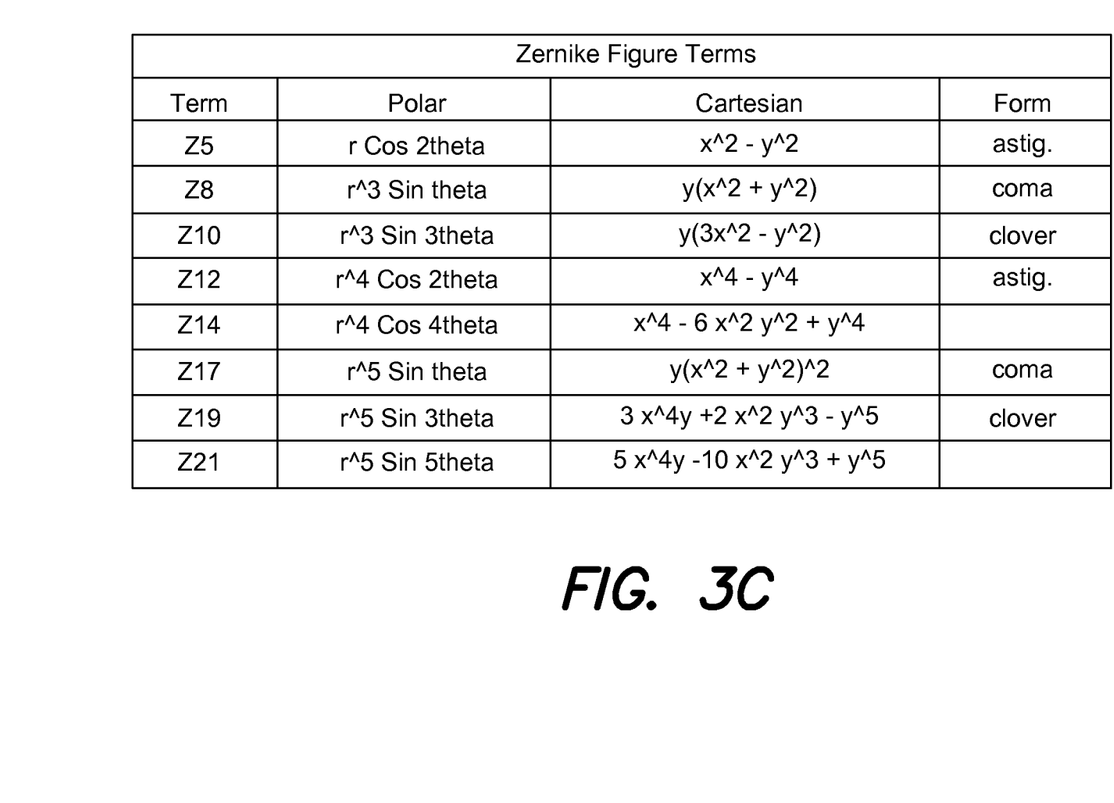
FIG. 3C is a table showing the Zernike figure terms used to calculate the Zernike terms provided in FIG. 3B.

The tables shown in FIGS. 3A-C provide an example of an optical prescription for one embodiment of an afocal 5MA 200 in accord with the aspects and principles disclosed herein. The optical prescription for this example may be generated using an equation which is an industry standard and which would be known to those skilled in the art. It is to be appreciated however, that the prescription given in FIGS. 3A and 3B is merely exemplary, and that the prescriptions of various embodiments of the afocal 5MA 200 are determined by the intended task to be performed by the optical system and desired system characteristics.

The system parameters for this example are as follows:
4.0× afocal magnification;
6.0 degrees circular FOV in;
5.0 inch entrance pupil;
9.243 inch entrance pupil offset;
1.24 inch exit pupil diameter;
(−)2.302 inch exit pupil offset; and
24.0 degree circular FOV out In FIG. 3A, the third column provides the radius of the respective surface, measured in inches. The minus sign indicates that the center of curvature is to the left of the mirror surface. The column designated CC is the conic constant which is equal to the negative squared value of the eccentricity of a conic section (a planar cut through a double sheeted conic surface). The columns designated Ad, Ae, Af and Ag are the aspheric constants of the specific mirror surfaces. The column designated "Thickness" provides the thickness of the respective surface, measured in inches. The column designated "Material" provides the material of the respective surface. The term "Refl." indicates a reflective material/surface.

FIG. 3B includes the Zernike polynomial coefficient terms for the relevant respective surfaces, corresponding to the prescription of FIG. 3A. As known to those skilled in the art, the Zernike polynomials are a sequence of polynomials that are both historically significant and very relevant in the description of optical surfaces and wavefront phase functions. The Zernike coefficient terms provided in FIG. 3B are calculated according to the term definitions, both polar and Cartesian, provided in FIG. 3C.

It is to be appreciated that at an approximately 2× reduced performance level, the optical prescription of FIGS. 3A and 3B can be practiced without the use of Zernike-described mirror surface figures indicated therein. In such an embodiment, the mirrors are described by only rotationally symmetric aspheric departures, meaning $R^4$ through $R^{12}$ aspheric terms. Those skilled in the art will appreciate that this result requires re-optimization of the mirror figure variables, and not just the simple deletion of the Zernike terms from the given prescription.

As discussed above, the new afocal 5MA optical form according to aspects and embodiments disclosed herein has two negative powered mirrors (the second mirror 220 and fourth mirror 240 in the example illustrated in FIG. 2). This allows a more favorable distribution of powers when compared a conventional afocal four-mirror anastigmat, which has only one negative powered mirror.

Figure 4:
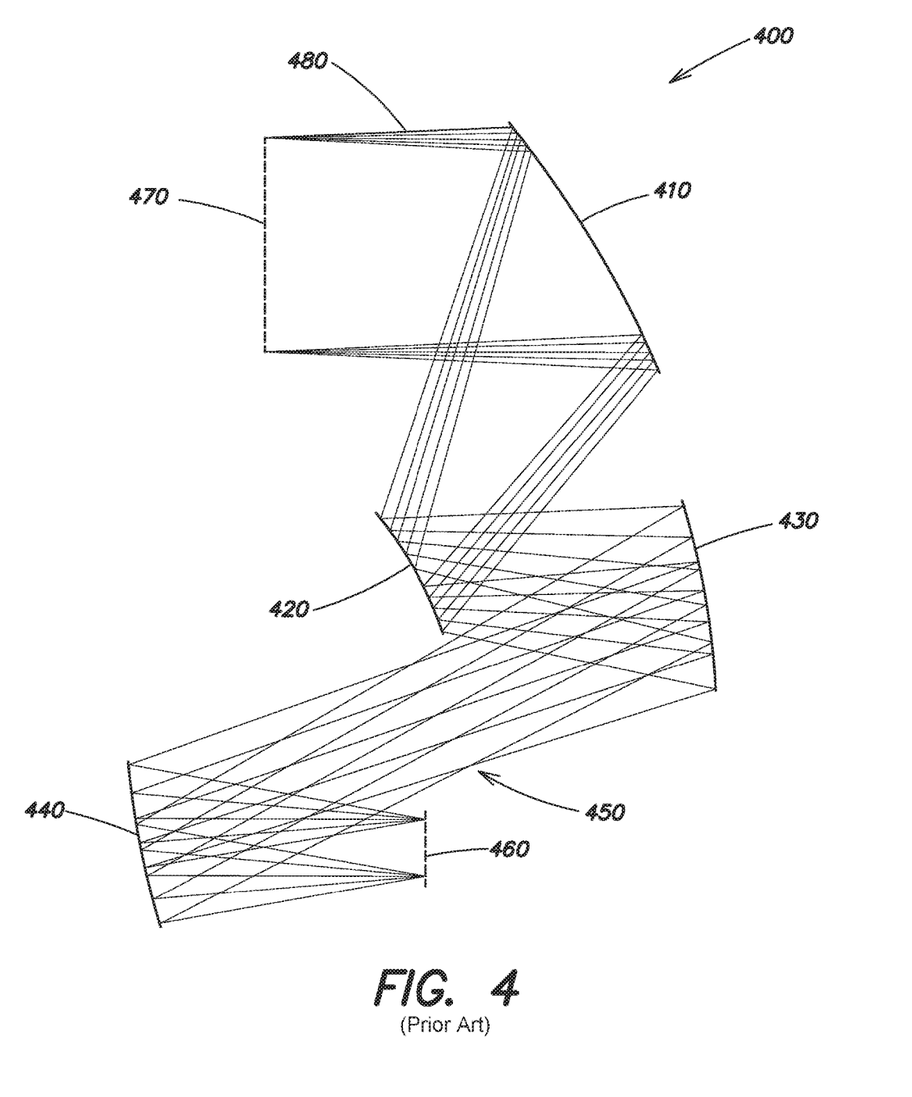
FIG. 4 is a ray trace of a comparative example of a conventional four-mirror afocal optical system.

FIG. 4 is a ray trace of a comparative example of a conventional afocal 4MA 400 having similar basic parameters as the above-discussed example of the afocal 5MA 200. In particular, the afocal 4MA 400 is designed with a 5.0 inch entrance aperture, the same as the above-discussed example of the afocal 5MA 200 corresponding to the optical prescription given in FIGS. 3A and 3B.

Referring to FIG. 4, the afocal 4MA 400 is a relayed, reimaging all-reflective afocal optical system including four non-spherical mirrors that sequentially reflect the electromagnetic radiation/beam path 480. The afocal 4MA 400 includes a primary mirror 410, which has positive optical power, reflecting into a secondary mirror 420, which has negative optical power. The secondary mirror 420 reflects into a tertiary mirror 430, which has positive optical power which, in turn, reflects into a quaternary mirror 440, which also has positive optical power. The primary mirror 410, secondary mirror 420, and tertiary mirror 430 constitute an objective forming an intermediate image 450. This intermediate image is focused at infinity by the quaternary mirror 440 (constituting a single-mirror recollimating eyepiece) which directs the collimated beam through the exit pupil 460. The exit pupil 460 is the projected image of the entrance pupil 470. The afocal 4MA 400 can also be considered as an afocal two-mirror Mersenne telescope (+ − power distribution; mirrors 410 and 420) followed by an afocal two-mirror pupil relay (+ + power distribution; mirrors 430 and 440).

The versatility and design flexibility provided by inclusion of the second negative powered mirror in the afocal 5MA 200 according to aspects and embodiments disclosed herein allows the afocal 5MA to have numerous advantages and improved performance over the conventional afocal 4MA 400 which has only one negative powered mirror. For example, for the 5.0 inch entrance aperture design, the afocal 5MA 200 can achieve 4.0× magnification and a 6.0 inch circular FOV; whereas the afocal 4MA 400 achieves only 3.75× magnification and a 5.6 inch circular FOV. Additionally, it can be appreciated that a comparison of FIGS. 2 and 4, indicates that the new afocal 5MA is at least 15% more compact than a comparably designed 4MA, and that size reduction accounts for more than 2.5 inches in overall height reduction at the scale indicated.

Conventional wisdom in the field of all-reflective afocal optical designs provides that including more mirrors in a design undesirably leads to larger physical size and increased complexity for similar design parameters, but is, in certain applications, required for optical performance reasons. For example, for a design with a 5.0 inch entrance aperture size, an afocal 4MA system is larger and more complex than an afocal 3MA system, but the 4MA form can provide enhanced optical performance (e.g., larger FOV) over the 3MA form, as discussed above. Surprisingly, and contrary to conventional wisdom in the art, embodiments of the afocal 5MA disclosed herein can have reduced physical size compared to a comparable conventional 4MA, while also achieving significantly improved optical performance. For example, referring to FIGS. 2 and 4, it can be seen that the afocal 5MA 200 is smaller and more compact than the afocal 4MA, for a design having the same entrance aperture size. For the 5.0 inch entrance aperture example discussed above and provided in FIGS. 3A and 3B, the afocal 5MA 200 is approximately 16.3 inches "tall" (measured from the top corner of the first mirror 210 to the bottom corner of the fifth mirror 250 in FIG. 2), whereas the afocal 4MA 400 of FIG. 4 is 18.9 inches tall (measured from the top corner of the primary mirror 410 to the bottom corner of the quaternary mirror 440 in FIG. 4). Additionally, in this example the afocal 5MA 200 has an effective focal length (EFL) in the objective (formed by mirrors 210-240) of 21.0 inches, and an EFL in the eyepiece (formed by mirror 250) of 5.22 inches; whereas the afocal 4MA 400 of FIG. 4 has an EFL of 28.9 inches in the objective (formed by mirror 410-430) and an EFL of 7.82 inches in the eyepiece (formed by mirror 440).

Furthermore, as discussed above, embodiments of the afocal 5MA 200 can achieve significantly enhanced optical performance relative to conventional afocal 4MA or 3MA designs. For example, as discussed above, embodiments of the afocal 5MA can achieve a wider usable FOV, for example, greater than 6° circular FOV, in a arrange of 6-8° circular FOV, or even approaching 10° circular FOV; whereas the usable FOV of 4MA designs is typically restricted to less than 6° circular FOV. In addition, the example of the afocal 5MA 200 corresponding to the optical prescription provided in FIGS. 3A and 3B is diffraction limited at 0.7 μm. For comparison, the conventional afocal 4MA 400 of FIG. 4 is diffraction limited at a much longer wavelength.

According to aspects disclosed herein, the reduced physical size of the afocal 5MA according to certain embodiments, and the enhanced optical performance, is achieved at least in part by having two negative powered mirrors in the design, compared to conventional afocal 3MA or 4MA designs which have only a single negative powered mirror. As discussed above, the afocal 5MA can be considered to be constituted of a two-mirror Mersenne telescope (mirrors 210 and 220) followed by a three-mirror afocal pupil relay (mirrors 230, 240, and 250). Having a negative powered mirror in both the Mersenne telescope (e.g., the second mirror 220) and the afocal pupil relay (e.g., the fourth mirror 240) allows both portions of the overall system to be individually optimized, and thereby achieve a more compact system having relatively reduced physical size. For example, the magnification provided by each of the Mersenne telescope and the afocal pupil relay can be individually optimized. In one example in which the overall system magnification is 4×, the Mersenne telescope (mirrors 210 and 220) can be designed for 2.77× magnification, and the afocal pupil relay (mirrors 230-250) can be designed for 1.44× magnification. The product of these two magnifications is the overall system magnification of 4.0×. The magnifications of each portion are thus relatively balanced, which allows for reduction of wasted space in the system, leading to a more compact form. As discussed above, because the negative optical power of both the second mirror 220 and the fourth mirror 240 is available to balance the optical power and field curvature of the other three mirrors, great design flexibility can be achieved, leading to a more capable (improved optical performance) and compact system. In contrast, the conventional afocal 4MA 400 of FIG. 4 has only a single negative powered mirror 420 which must balance the field curvature of the remaining three mirrors, and the system design is therefore far more constrained. For example, to achieve 3.75× magnification, as in the example mentioned above, the Mersenne telescope (mirrors 410 and 420) has 3.67× magnification and the pupil relay (mirror 430 and 440) has only 1.02× magnification, a far less balanced, and therefore less optimal, arrangement than can be achieved for the new afocal 5MA example discussed above.

Thus, aspects and embodiment provide a new five-mirror afocal optical form that advantageously leverages the inclusion of two negative powered mirrors (in combination with three positive powered mirrors) to achieve superior optical performance, including both larger usable FOV and improved diffraction limited performance, and a more compact physical size relative to existing all-reflective afocal systems.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only. In particular, it is to be appreciated that embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation. The scope of the invention should be determined from proper construction of the appended claims, and their equivalents.

What is claimed is:

1. A five mirror all-reflective afocal optical system consisting of:
    a positive-powered primary mirror arranged and configured to receive and reflect collimated electromagnetic radiation received via an entrance pupil of the afocal optical system;
    a negative-powered second mirror arranged and configured to receive and further reflect the electromagnetic radiation reflected from the primary mirror;
    a positive-powered third mirror arranged and configured to receive and further reflect the electromagnetic radiation reflected from the secondary mirror;
    a negative-powered fourth mirror arranged and configured to receive and further reflect the electromagnetic radiation reflected from the tertiary mirror to form an intermediate image; and
    a positive-powered fifth mirror configured to receive and re-collimate the electromagnetic radiation reflected from the quaternary mirror and to reflect the re-collimated electromagnetic radiation through an exit pupil of the afocal optical system, the intermediate image being located between the fourth and fifth mirrors.

2. The five mirror all-reflective afocal optical system of claim 1 wherein a circular field of view of the system is in a range of approximately 6° to 10°.

3. The five mirror all-reflective afocal optical system of claim 2 wherein a magnification of system is approximately 4.0×.

4. The five mirror all-reflective afocal optical system of claim 3 wherein the entrance pupil has a diameter of approximately 5.0 inches.

5. The five-mirror all-reflective afocal optical system of claim 1 wherein each of the first, second, third, fourth, and fifth mirrors has an aspheric surface figure.

6. A five-mirror all-reflective afocal optical system consisting of:
    first, second, third, fourth, and fifth mirrors arranged in numerical order to sequentially reflect from one another electromagnetic radiation received at the first mirror via a system entrance pupil to produce a collimated output beam of the electromagnetic radiation at a system exit pupil, the electromagnetic radiation received at the first mirror being collimated, the first, second, third, fourth, and fifth mirrors consisting of three positive-powered mirrors and two negative-powered mirrors, wherein optical powers of the first, second, third, fourth, and fifth mirrors are balanced to achieve a flat field condition at the system exit pupil, wherein the first, second, third, and fourth mirrors cooperate to form an intermediate image located between the fourth and fifth mirrors, and wherein the fifth mirror is configured to recollimate the electromagnetic radiation received from the fourth mirror via the intermediate image to produce the collimated output beam at the system exit pupil.

7. The five-mirror all-reflective afocal optical system of claim 6 wherein the first and second mirrors are arranged as a Mersenne telescope and the third, fourth, and fifth mirrors are arranged to form an afocal pupil relay, the Mersenne telescope including a first one of the three positive powered mirrors followed by a first one of the two negative powered mirrors, and the afocal pupil relay including a second one of the two negative powered mirrors positioned between second and third ones of the three positive powered mirrors, such that the system has a + − + − + optical power distribution.

8. The five mirror all-reflective afocal optical system of claim 7 wherein the entrance pupil has a diameter of approximately 5.0 inches, and the system has a magnification of approximately 4.0× and a circular field of view in a range of approximately 6° to 10°.

9. The five-mirror all-reflective afocal optical system of claim 6 wherein each of the first, second, third, fourth, and fifth mirrors has an aspheric surface figure.

10. The five mirror all-reflective afocal optical system of claim 6 wherein the first mirror has positive optical power, the second mirror has negative optical power, the third mirror has positive optical power, the fourth mirror has negative optical power, and the fifth mirror has positive optical power.

11. A five-mirror all-reflective afocal optical system consisting of:
a two-mirror Mersenne telescope consisting of a first positive-powered mirror configured to receive collimated electromagnetic radiation via a system entrance pupil and to reflect the electromagnetic radiation, and a first negative-powered mirror configured to receive and further reflect the electromagnetic radiation reflected from the first positive-powered mirror; and
a three-mirror afocal pupil relay consisting of a second positive-powered mirror configured to receive and reflect the electromagnetic radiation from the two-mirror Mersenne telescope, a second negative-powered mirror configured to receive and further reflect the electromagnetic radiation to form an intermediate image, and a third positive-powered mirror configured to receive the electromagnetic radiation from the intermediate image and to collimate the electromagnetic radiation to provide a collimated output beam of the electromagnetic radiation at a system exit pupil.

12. The five-mirror all-reflective afocal optical system of claim 11 wherein optical powers of the first positive-powered mirror, the first negative-powered mirror, the second positive-powered mirror, the second negative-powered mirror, and the third positive-powered mirror are balanced to achieve a flat field condition at the system exit pupil.

13. The five-mirror all-reflective afocal optical system of claim 12 wherein each of the first positive-powered mirror, the first negative-powered mirror, the second positive-powered mirror, the second negative-powered mirror, and the third positive-powered mirror has an aspheric surface figure.

14. The five-mirror all-reflective afocal optical system of claim 13 wherein the entrance pupil has a diameter of approximately 5.0 inches, and the system has a magnification of approximately 4.0× and a circular field of view in a range of approximately 6° to 10°.

* * * * *